United States Patent Office 2,955,971
Patented Oct. 11, 1960

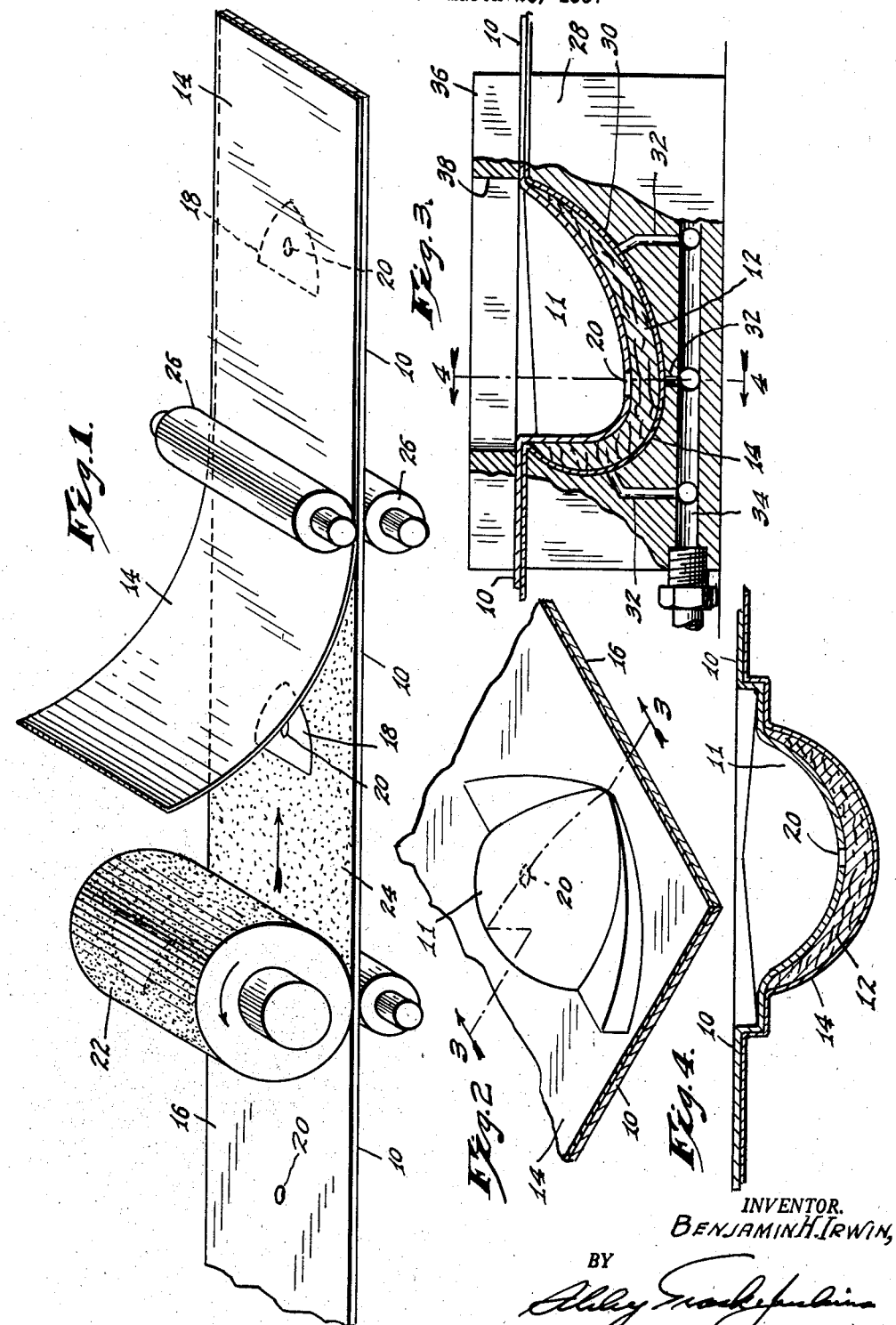

2,955,971

METHOD OF MAKING PADDED ARTICLES

Benjamin H. Irwin, Columbus, Ind., assignor to Arvin Industries, Inc., Columbus, Ind., a corporation of Indiana Filed Mar. 28, 1957, Ser. No. 649,051

2 Claims. (Cl. 154—110)

My invention relates to a method of making a padded article, especially an article comprising a sheet-metal or other relatively rigid structural member, a foam-elastomer pad thereon, and a skin of flexible sheet material covering both the pad and the structural member beyond the margin of the pad. This method is especially well suited for the production of articles, such as an automobile door panel provided with an integral padded arm rest, where the pad has a small extent relative to the entire panel.

It is the general object of my invention to facilitate and reduce the cost of making a durable laminated structure of the type referred to above. More specifically, it is an object of my invention to provide a method of making such a laminated padded panel in which the pad is selectively formed in the desired shape and position on said panel and is integrally bonded to said skin.

In carrying out my invention in the preferred form, a skin of flexible sheet material, conveniently a vinyl polymer, is laid on a structural member and cemented or otherwise bonded thereto except over the area which is to be occupied by the desired pad. In most instances, the structural member will be a sheet metal panel which, if desired, may be subjected to a forming operation after the skin has been applied to it. A foam-elastomer composition in uncured state is introduced between the skin and the structural member through a hole provided in the latter within the margin of that area which is not bonded to the skin; and such composition is cured while the adjacent skin is distended under the influence of a differential fluid pressure against the wall of an appropriately shaped die-cavity. Preferably, the differential pressure which distends the skin is created by exhausting air from the die-cavity while the skin-covered face of the structural member is held in contact with the face of the die beyond the margin of the cavity.

The accompanying drawing illustrates one embodiment of my invention. In such drawing:

Fig. 1 is an isometric view of a metal strip used to form my panels and showing successive steps for selectively bonding a plastic skin thereon;

Fig. 2 is a fragmentary isometric view of a skin covered panel worked to a desired pad-supporting contour;

Fig. 3 is a longitudinal section of a die with a laminated skin covered panel therein and showing the pad forming operation; and Fig. 4 is a transverse section taken on the line 4—4 of Fig. 3 and showing an automobile door panel or liner having a padded arm rest formed integrally therewith.

The automobile door panel having an integrally formed arm rest shown in the drawings is shown to illustrate one use of my invention. In such an embodiment the metal panel 10 which constitutes the structural member of the panel is formed to provide an arm-rest boss 11, and is covered by a pad 12, and the pad is in turn covered by a skin 14 which also covers the face of the panel beyond the limits of the pad.

In the illustrated method of making such a structure, a continuous metal strip 16 is cleaned to remove any surface dirt and an adhesive is applied to one face of the sheet except over those areas, indicated at 18, which are to be covered with pads. Desirably, centered within each uncoated area is a sprue hole 20, whose purpose will become more apparent hereinafter. As shown in Fig. 1, the sheet 16 is passed in contact with a printing-roller 22 which applies to the sheet suitable adhesive 24, desirably a thermoplastic resin, in a pattern such that the areas 18 are left bare. A thin sheet of flexible material constituting the skin 14 is applied to the selectively coated face of said sheet. Preferably the skin 14 is formed from a thermoplastic vinyl polymer, such as polyvinylchloride.

The use of a printing process to apply the adhesive to selected areas of the sheet while other areas are left bare is described merely by way of example, as other methods of rendering the surface of the sheet adhesive only over predetermined areas may be used.

The plastic skin 14 is affixed to the metal sheet 16 by a pair of rollers 26 which press said sheet and skin tightly together bonding said skin to the adhesive areas of the metal sheet. When the adhesive employed is of the thermoplastic type, the adhesive coated sheet is heated prior to passing through the rollers 26 to soften and condition the adhesive for bonding the skin to the panel.

The metal sheet 16 having the skin bonded thereon is cut into the individual panels 10 of the desired size, and may, if desired, be worked into any desired shape. Such working may include forming the unbonded areas 18 to provide a support, such as the boss 11, of desired shape for the pad. It is to be understood, of course, that the panel sections can be produced by my process on an individual unit basis, rather than by cutting a continuous strip of the skin-covered metal 16 into individual panels.

To form a resilient foam-elastomer pad between the unbonded skin and the panel, the panel is placed on a die 28 with the skin in contact with the die-face and the unbonded skin areas confined with the limits of a die-cavity 30 having a shape corresponding to that of the desired pad. Where the cavity is to be exhausted to create the differential pressure which distends the skin into contact with the cavity walls, such walls are provided with openings 32 connected through suitable passages 34 to a vacuum pump for exhausting the die-cavity. The panel is held in a fixed position in the die 28 by a clamp 36 having a centrally disposed opening 38.

When the panel is thus positioned on the die 28, said die, if not already hot, is heated sufficiently to soften and make pliable the unbonded areas of the skin 14. With the skin thus softened, a vacuum is pulled on the die-cavity 30 distending the unbonded skin area away from the panel so that it is disposed against, and supported by, the walls of said cavity; and a foam-elastomer composition, such as a synthetic latex including a heat-activated foaming agent, is introduced into the void between the panel and the distended skin through the sprue hole 20 in the panel. After the desired amount of said compound has been introduced, the die is heated to a temperature necessary for foaming and curing the elastomer to convert it into the resilient spongy pad 12 confined between the skin 14 and the panel 10. To permit the free expansion of the elastomer for producing a pad of uniform density, the vacuum is maintained until the elastomer foam has cured to a point such that it is capable of resisting any undesirable pad-distorting contraction of the distended skin.

After the curing operation is completed, the panel now having the pad 12 formed therein can be removed from the die, and the marginal edges of the skin covered panel extending peripherally around said pad may be worked to provide any desired panel shape without disturbing the skin-panel bond.

The method above described is susceptible to considerable variation without departing from the spirit and scope of my invention as defined in the claims which follow. For example, instead of introducing between the skin and structural member an unfoamed latex containing a heat-activated foaming agent, I may introduce a prefoamed latex which requires only curing after its introduction. Again, while I prefer to employ a vacuum to distend the skin into contact with the cavity walls before the latex is introduced, such distension may be produced by pressure applied to the latex or generated therein as an incident to a foaming step.

I claim as my invention:

1. A method of forming a laminated padded article wherein a rigid pad-suporting structural member extends beyond the margin of the pad, comprising applying a sheet of flexible, stretchable skin-forming material to the structural member and bonding such material to the coplanar peripheral margins of the structural member outside the extent of a predetermined area to be occupied by the pad, forming the structural member within the limits of such area into the desired contour after said bonding step, heating said skin-forming material to increase its flexibility, introducing a foam-elastomer composition between the skin-forming material and the structural member at such predetermined area while maintaining the skin-forming material at such area heated and distended under the influence of externally applied differential pressure, supporting both the undistended and the distended areas of the skin-forming material exteriorly to confine it to the desired pad-shape, and curing said composition while maintaining said predetermined skin area distended and supported.

2. A method of making laminated padded articles each having a rigid sheet-like pad-supporting panel which extends beyond the limits of the pad, comprising applying to a continuous flat sheet of panel-forming material a sheet of flexible, stretchable skin-forming material and bonding said materials together while in the flat except over predetermined spaced areas to be occupied by pads, cutting said bonded sheets into sections, each comprising a skin covered panel containing one of such predetermined unbonded areas surrounded by a coplanar marginal area in which the skin-forming material is bonded to the panel, introducing a foam-elastomer composition between the panel and skin-forming material at such predetermined area while maintaining the skin-forming material at such area distended under the influence of externally applied differential pressure, supporting both the undistended and the distended areas of the skin-forming material exteriorly to confine it to the desired pad-shape, and curing said composition while maintaining said predetermined skin area distended and supported.

References Cited in the file of this patent

UNITED STATES PATENTS

| | | |
|---|---|---|
| 1,565,582 | Moore | Dec. 15, 1925 |
| 2,338,490 | Cunnington | Jan. 4, 1944 |
| 2,649,395 | Maurer et al. | Aug. 18, 1953 |
| 2,753,642 | Sullivan | July 10, 1956 |
| 2,801,199 | Meyers | July 30, 1957 |